Feb. 25, 1958  A. E. ERLINDER  2,824,659
LIFT GATE FOR DUMP TRUCK
Filed Jan. 10, 1955  4 Sheets-Sheet 2
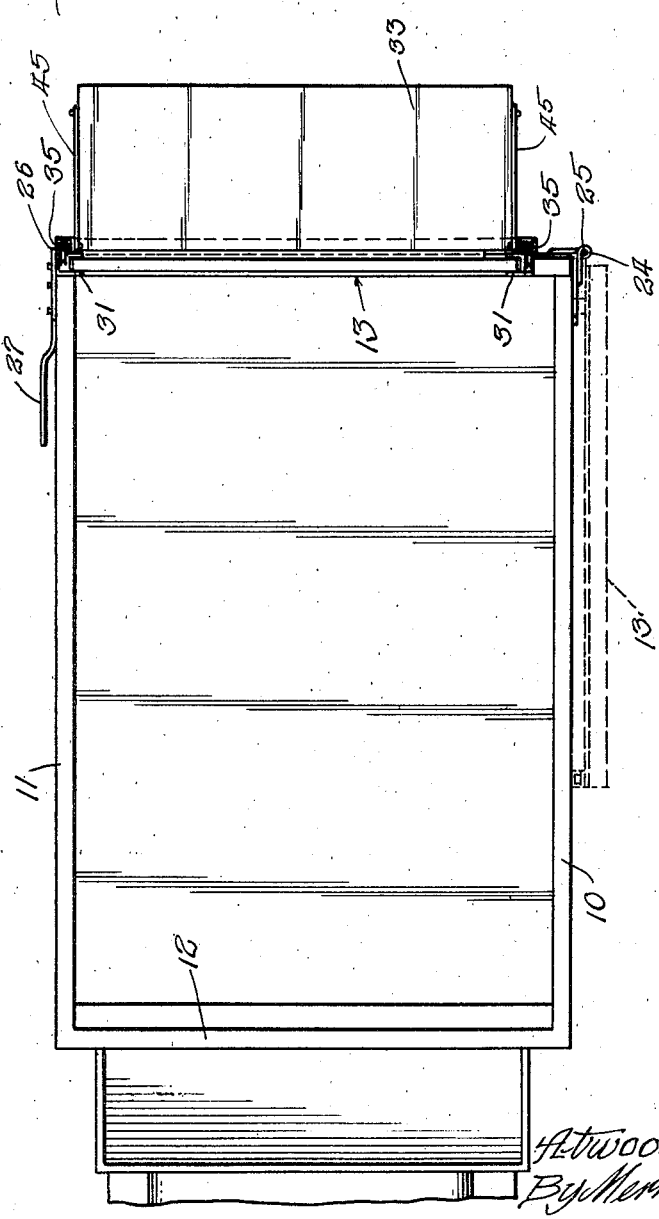
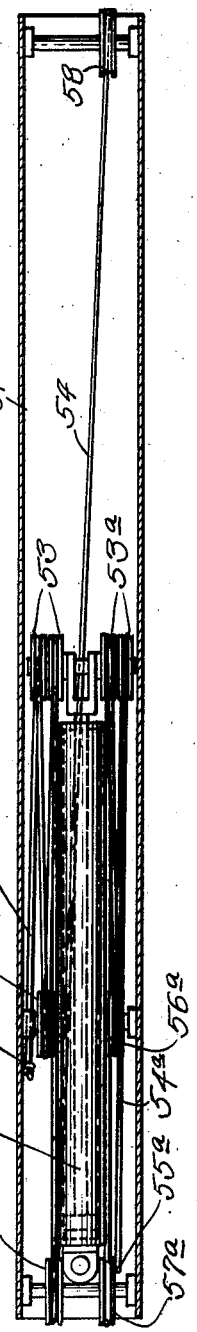
Inventor:
Atwood E. Erlinder
By Merriam & Lorch, Attys.

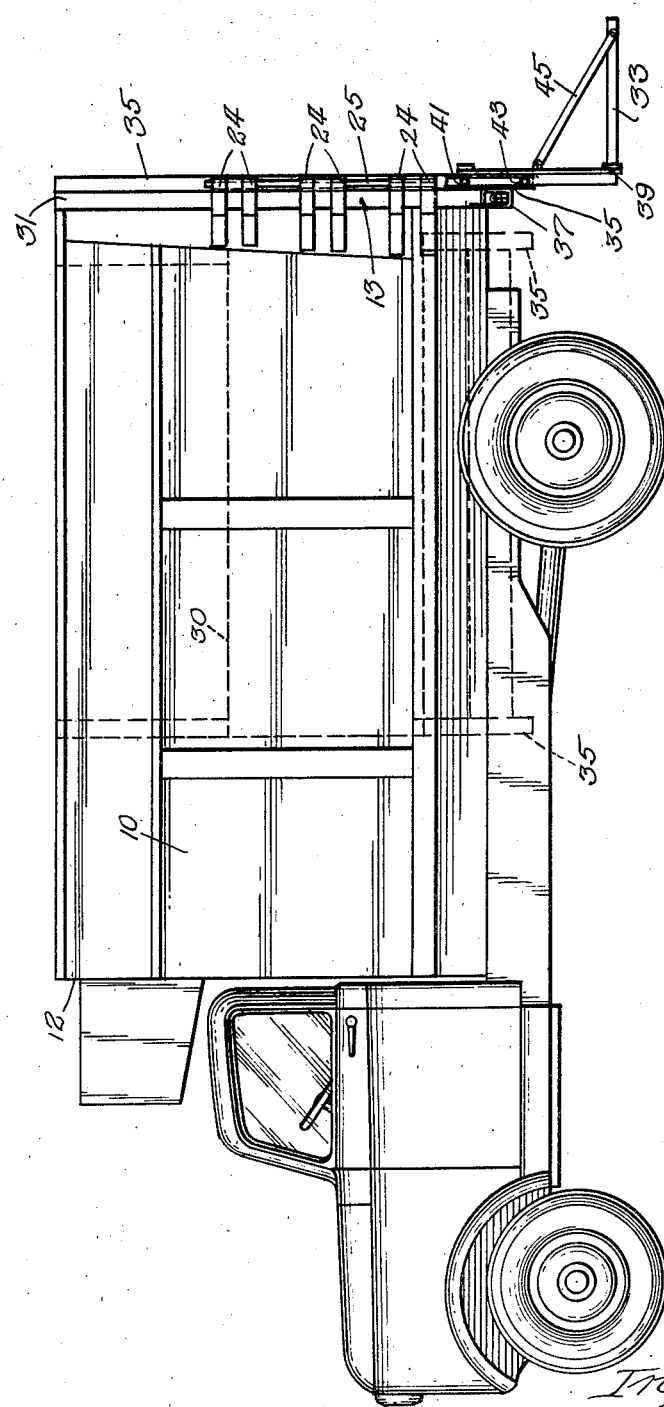

Feb. 25, 1958 — A. E. ERLINDER — 2,824,659
LIFT GATE FOR DUMP TRUCK
Filed Jan. 10, 1955 — 4 Sheets-Sheet 3

Inventor:
Atwood E. Erlinder
By Merriam & Lorch, Attys.

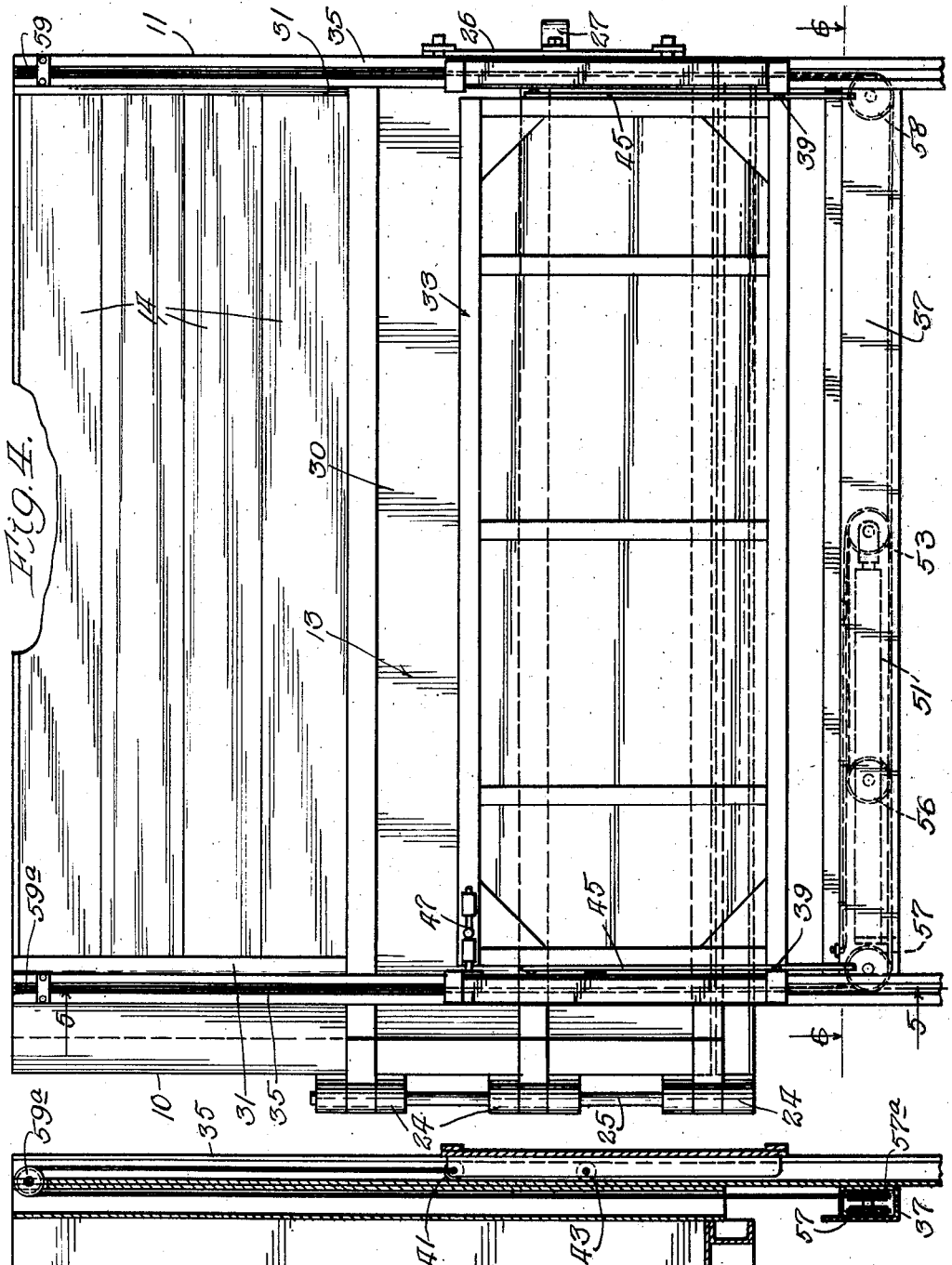

United States Patent Office 2,824,659
Patented Feb. 25, 1958

2,824,659

LIFT GATE FOR DUMP TRUCK

Atwood E. Erlinder, Chicago, Ill.

Application January 10, 1955, Serial No. 480,780

7 Claims. (Cl. 214—503)

My invention relates to a lift for a truck body and more particularly to an elevating platform at the tail gate end of a dump truck body, which platform will range in operation from substantially ground level to the top of the side panels of the truck body and will not interfere with dumping of the body or with complete emptying of the contents of the body when desired.

Lifting platforms have been made in the past but so far as I know, as heretofore made, they have very definite limitations. For example, such platforms cannot be used with a dump truck body for several reasons, the most obvious of which are that prior platforms when in the lower positions would engage the ground or truck wheels upon lifting of the body and would also interfere with discharging the contents of the body when the latter is lifted, as is common in dump truck bodies. In addition, such platforms were not adaptable to dump truck bodies because they constituted the tail gate, that is, a portion of the rear enclosure of the body rather than an elevating platform associated with but independent of the usual tail gate. Side lifts have also been used but these increase the width of a truck to a prohibitive size.

In many uses of dump truck bodies it is desirable, if not necessary, to have an elevating platform that is associated with but operable independently of the tail gate and/or of the rear closure of the body so that material can be raised and deposited in the body with the tail gate or rear closure in closed position. Obviously, a lifting tail gate that is a mere extension of the truck floor when in raised position would not serve for most dump truck uses.

According to my invention I have provided a lifting or elevator-like platform which is exterior of the tail gate and/or rear closure of a dump truck body and which travels from a position closely adjacent the ground to an elevated position adjacent the top of the body enclosure, thus making it convenient to elevate one or more cans, for example, from approximately the ground level to any desired height up to the top of a dump truck body. This facilitates loading of the body even as it fills. In the preferred form of my invention the elevating platform is carried by and on the exterior of the tail gate or rear closure of the truck body, the gate being hinged to one side body panel upon a vertical pivot whereby the elevating platform which is also preferably hinged at one edge about a horizontal pivot can be swung completely out of position with the tail gate or closure when the latter is opened to permit lifting (dumping) of the body to discharge the contents of the body when the latter is raised, as is common in dump truck bodies.

A better understanding will be had of my invention from the following description if read in connection with the accompanying drawings, in which:

Figure 1 is a side elevation of a dump truck having a rear elevating platform of my invention, the latter being shown in a low position;

Figure 2 is a top plan of a dump truck body illustrating the two positions of the tail gate and elevating platform;

Figure 4 is a rear elevation of a dump truck body with the tail gate in closed position and the elevated platform inoperative or in collapsed position, being the normal position when the truck is in motion;

Figure 5 is a fragmentary vertical section taken along line 5—5 of Figure 4; and Figure 6 is a fragmentary horizontal section taken along line 6—6 of Figure 4.

Figure 3:
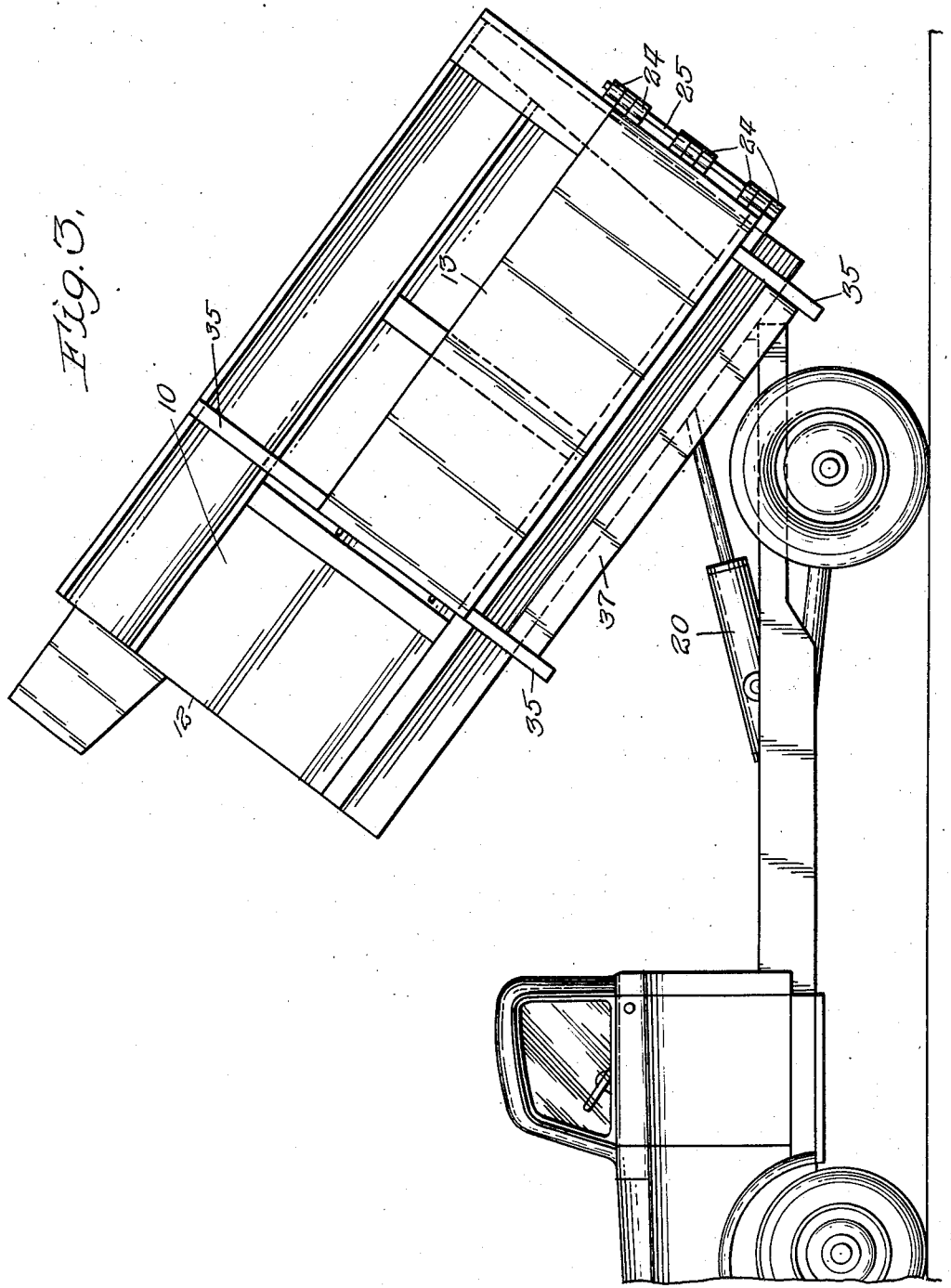
Figure 3 is a side elevation of a dump truck body showing the body in an elevated position and the tail gate and elevator platform in fully opened position.

As can be seen from the drawings my invention is particularly useful in combination with a dump truck body as shown more fully in Figures 1 and 3. Such a truck body comprises side panels 10 and 11 (Fig. 2), a front panel 12 and a rear panel assembly 13 usually termed a tail gate. The side and front panels are customarily of the same height whereas the tail gate normally does not extend to the full height of the side panels but may be so extended by removable sections 14 when the load in the truck requires a complete enclosure at the rear end to the height of the side panels.

The body, as is customary, is hinged on a horizontal pivot adjacent the floor and at the rear end thereof so that the body may be tilted (dumped) in the usual manner by the hydraulic cylinder 20 (Fig. 3). In the body shown, the tail gate is hinged at one side to the rear end of panel 10 by hinges 24 having a vertical pivot 25 so that the entire tail gate assembly can be swung outwardly horizontally on the pivot 25 so as to leave the entire rear end of the dump body open for ready discharge of the contents. The tail gate assembly may be retained in closed position by any suitable latching mechanism 26 manually operable by handle 27.

The tail gate assembly 13 comprises a panel section 30 of sufficient width to extend between the side panels 10 and 11 but of less height than these panels, which section is secured to two hollow side posts 31 which extend above the panel 30 at each end thereof. The upper portions of the posts serve as guides and retainers for the tail gate extension members 14 when it is desired to use the latter. Two substantially closed channel-like or box-like guide rails 35 having rearwardly opening slots are welded or otherwise secured to the rear surface of the panel 30 and preferably to the posts 31. These guide rails extend from the top of the posts 31 to a point well below the truck body and preferably close to the ground level so as to guide the lifting platform 33, to be described more fully later, to corresponding positions. Welded across the bottoms of the guide rails 35 is a channel-like cross member 37 which houses the hydraulic lifting mechanism, later described, for raising the platform 33.

Platform 33 extends across substantially the full width of the tail gate and is hinged at its forward corners by horizontal pivots 39 to the lower ends of two short lengths of I-beams, the upper ends of which carry two spaced pairs of antifriction rollers 41 and 43 adapted to travel in the guide rails 35. Accordingly, the platform may be raised from its horizontal rearwardly projecting and operating position to a vertical retracted position in juxtaposition to the tail gate assembly. The platform may be retained in its horizontal position by bracing links 45 pivotally attached to the outer edges of the platform and to an intermediate point on the I-beams. One of the ends of the braces is preferably provided with a readily releasable pin so that the braces may be readily disconnected at one end to permit folding of the platform into its retracted position. The platform may be retained in its raised or folded position by means of retractable bolt latches 47. It follows from the foregoing that the platform 33 is movable from a lowermost position adjacent ground level to uppermost position a short distance below the top of the body during which movement rollers 41 and 43 travel within the guide rails 35.

Power means are provided for raising the platform to any desired position within the limits of travel of rollers 41 and 43 within rails 35. Any suitable means for doing this may be employed but I have shown a hydraulic cylinder 51 positioned within the channel member 37, which cylinder has the usual piston or plunger which carries two pairs of rollers 53 and 53a upon its exposed or outer end for engaging and pulling upon a pair of cables 54 and 54a. One end of cable 54 is fastened to the upper flange of the channel 37 at 55, extends to the right (Figs. 4 and 6), travels around one pulley 53 on the piston, then to the left and around an intermediate pulley 56 fastened to the channel, then to the right and around the second pulley 53, then to the left end of channel 37, around pulley 57 at the latter end of the channel, then across the entire channel to the right, around the pulley 58, then upwardly through the right post 31 (Fig. 4), around the pulley 59 at the top thereof, then down through guide rail 35 and is attached to the upper end of the I-beam traveling in the right guide rail. The other cable 54a is attached at one end to the left end of the channel at 55a, extends to the right and around one pulley 53a on the plunger of the cylinder, then to the left in channel 37 and around a second intermediate pulley 56a, then back to the right and around the second pulley 53a on the plunger, then left back across the channel 37 and around the end pulley 57a in the left end of channel 37, upwardly through the guide rail to the top, around a pulley 59a (Fig. 5) at the top end thereof, down through the post 31 and is attached at its other end to the I-beam traveling in the left guide rail 35 and carrying the platform 33.

It will be apparent from the foregoing that as the piston of cylinder 51 is forced out by hydraulic pressure forces will be exerted on the cables and the platform will be raised. Hydraulic fluid under pressure for operating both the platform raising cylinder and the dumping cylinder is provided in the usual manner by an engine driven pump (not shown) as is customary in this type of vehicle. Also from the foregoing it will be observed that my invention provides an elevator platform which can be raised from a position adjacent the ground to a position adjacent the top of the truck body independently of the tail gate, that is, while the tail gate is closed. Furthermore, when it is desired to dump the truck body the entire tail gate assembly including the lifting platform may be swung upon hinges 24, first, of course, folding the platform to its vertical position, and the entire tail gate assembly may be swung back to a position substantially parallel to and adjacent the right side panel of the truck body. In this position the tail gate assembly may be held by any suitable means (not shown) and the truck body can be lifted or dumped without any interference from the lifting platform and without any interference to full discharge of the contents of the truck.

It will be apparent to those skilled in the art that variations may be made in the details of construction without departing from the spirit and scope of this invention as defined in the appended claims.

I claim:

1. The combination with a dump truck body of the type pivoted at its rear end about a horizontal axis adjacent the floor level and having side panels and a tail gate, the latter being pivoted about a vertical axis at one side to the rear end of one side panel of the body, of a horizontal platform adjacent the exterior of said tail gate when the latter is in closed position and carried thereby, means for guiding said platform for vertical movement adjacent and exterior of said tail gate, and means for raising and lowering said platform.

2. The combination of a dump truck body and platform as defined in claim 1 wherein said platform is hinged along its horizontal edge adjoining the tail gate whereby said platform may be folded into vertical position alongside and exterior of said tail gate.

3. The combination of a dump truck body and platform as defined in claim 1 wherein said guiding means extends from a position adjacent the ground level to a position adjacent the top of said side panels whereby said platform may assume positions exterior of said tail gate from a position adjacent the ground level to a position adjacent the top of said side panels.

4. The combination of a dump truck body and platform as defined in claim 2 wherein said guiding means extends from a position adjacent the ground level to a position adjacent the top of said side panels whereby said platform may assume positions exterior to said tail gate from a position adjacent the ground level to a position adjacent the top of said side panels.

5. The combination with a dump truck body of the type pivoted at its rear end about a horizontal axis adjacent the floor level and having side panels and a tail gate pivoted about a vertical axis at one side to the rear end of one side panel of the body, of a horizontal platform adjacent to and exterior of said tail gate, vertical guide rails secured to each side of said tail gate upon the exterior surface thereof and extending from a point substantially at ground level to a point at the top of said side panels for guiding said platform for vertical movement exterior of and adjacent the tail gate from a position adjacent ground level to a position adjacent the top of said side panels, a channel member extending across and secured to the lower ends of said vertical rails, and hydraulic means positioned within said channel member and operating connections between said hydraulic means and said platform for raising and lowering said platform to and from said positions.

6. The combination with a dump truck body of the type pivoted at its rear end about a horizontal axis adjacent the floor level and having side panels and a tail gate, of a horizontal platform adjacent the exterior of said tail gate when the latter is in closed position, vertical guide rails at each side of said tail gate upon the exterior surface thereof and extending from a point substantially at ground level to a point at the top of said side panels for guiding said platform for vertical movement adjacent to and exterior of the tail gate from a position adjacent the top of said side panels, a channel member extending across the lower ends of said vertical rails, and hydraulic means positioned within said channel member and having operating connections between said hydraulic means and said platform for raising and lowering said platform.

7. The combination with a dump truck body and a platform as defined in claim 6 wherein said operating connections include cables extending from hydraulic means over pulleys adjacent the lower ends of said guide rails and over pulleys adjacent upper ends of said guide rails to said platform.

References Cited in the file of this patent

UNITED STATES PATENTS

| | | |
|---|---|---|
| 1,458,240 | Otterson | June 12, 1923 |
| 2,498,161 | Hamilton | Feb. 21, 1950 |
| 2,701,654 | Williamson | Feb. 8, 1955 |
| 2,706,565 | Krasno | Apr. 19, 1955 |